United States Patent
Uenaka et al.

(10) Patent No.: US 12,205,773 B2
(45) Date of Patent: Jan. 21, 2025

(54) ELECTROLYTIC CAPACITOR AND CAPACITOR ELEMENT

(71) Applicant: Panasonic Intellectual Property Management Co., Ltd., Osaka (JP)

(72) Inventors: Keita Uenaka, Osaka (JP); Kei Hirota, Okayama (JP); Hideki Shimamoto, Kyoto (JP); Nao Matsumura, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 71 days.

(21) Appl. No.: 17/904,841

(22) PCT Filed: Mar. 18, 2021

(86) PCT No.: PCT/JP2021/010999
§ 371 (c)(1),
(2) Date: Aug. 23, 2022

(87) PCT Pub. No.: WO2021/193330
PCT Pub. Date: Sep. 30, 2021

(65) Prior Publication Data
US 2023/0105494 A1    Apr. 6, 2023

(30) Foreign Application Priority Data

Mar. 25, 2020 (JP) .................. 2020-055053

(51) Int. Cl.
*H01G 9/028* (2006.01)
*H01G 9/012* (2006.01)
*H01G 9/15* (2006.01)

(52) U.S. Cl.
CPC ............. *H01G 9/028* (2013.01); *H01G 9/012* (2013.01); *H01G 9/15* (2013.01)

(58) Field of Classification Search
CPC ........... H01G 9/028; H01G 9/012; H01G 9/15
See application file for complete search history.

(56) References Cited

U.S. PATENT DOCUMENTS 9,240,285 B2 *   1/2016  Djebara ................. H01G 9/028
10,325,728 B2 *  6/2019  Uka ....................... H01G 9/028
(Continued)

FOREIGN PATENT DOCUMENTS

CN          105405659 A   *  3/2016
JP       2004088073 A   *  3/2004    ............. H01G 9/012
(Continued)

OTHER PUBLICATIONS

International Search Report of PCT application No. PCT/JP2021/010999 dated May 25, 2021.

*Primary Examiner* — Dion R. Ferguson
(74) *Attorney, Agent, or Firm* — Rimon P.C.

(57) ABSTRACT

An electrolytic capacitor includes a capacitor element. The capacitor element includes an anode body, a dielectric layer disposed on a surface of the anode body, a solid electrolyte layer covering at least a part of the dielectric layer, and a first layer covering at least a part of the solid electrolyte layer. The first layer is in contact with the solid electrolyte layer. The first layer constitutes at least a part of the cathode lead-out layer. An electrode potential $P_s$ of the solid electrolyte layer is higher than an electrode potential $P_1$ of the first layer.

7 Claims, 1 Drawing Sheet

(56) References Cited

U.S. PATENT DOCUMENTS

| | | | | |
|---|---|---|---|---|
| 2005/0212094 A1* | 9/2005 | Takagi | .................... | H01B 1/122 |
| | | | | 257/642 |
| 2006/0044736 A1* | 3/2006 | Taketani | ................. | H01G 9/15 |
| | | | | 361/523 |
| 2014/0168858 A1* | 6/2014 | Satoh | ..................... | H01G 9/028 |
| | | | | 361/527 |
| 2014/0321029 A1* | 10/2014 | Djebara | ............... | H01G 9/0425 |
| | | | | 361/528 |
| 2016/0379759 A1* | 12/2016 | Matsumoto | ............ | H01G 9/048 |
| | | | | 361/530 |
| 2018/0330888 A1* | 11/2018 | Shi | ......................... | H01G 9/028 |
| 2023/0105494 A1* | 4/2023 | Uenaka | ................. | H01G 9/012 |
| | | | | 361/523 |

FOREIGN PATENT DOCUMENTS

| | | | | | |
|---|---|---|---|---|---|
| JP | 2005135853 A | * | 5/2005 | | |
| JP | 2005-281410 | | 10/2005 | | |
| JP | 2005-286072 | | 10/2005 | | |
| JP | WO2005014692 A1 | * | 10/2006 | | |
| WO | WO-2020153242 A1 | * | 7/2020 | ............. | H01G 9/028 |
| WO | WO-2021066091 A1 | * | 4/2021 | ............... | H01G 4/30 |

\* cited by examiner

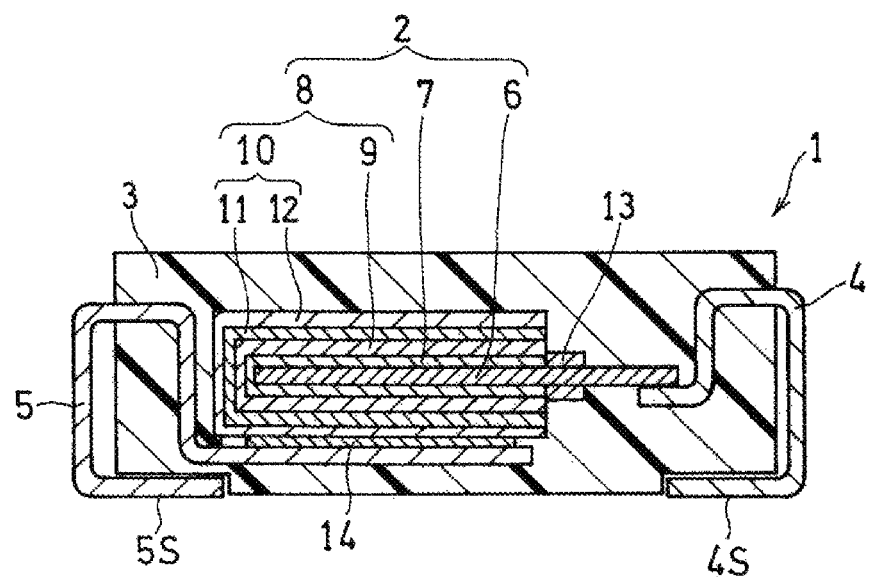

ELECTROLYTIC CAPACITOR AND CAPACITOR ELEMENT

TECHNICAL FIELD

The present disclosure relates to a capacitor element including a solid electrolyte layer containing a conductive polymer, and an electrolytic capacitor including the capacitor element.

BACKGROUND

As capacitors having a small size, a large capacitance, and a low equivalent series resistance (ESR), promising candidates are electrolytic capacitors including a capacitor element including a solid electrolyte layer containing a conductive polymer. The capacitor element includes, for example, an anode body, a dielectric layer formed on at least a part of a surface of the anode body, a solid electrolyte layer covering at least a part of the dielectric layer, and a cathode lead-out layer covering at least a part of the solid electrolyte layer. An electrolytic capacitor including a solid electrolyte layer is also referred to as a solid electrolytic capacitor.

Unexamined Japanese Patent Publication No. 2005-281410 proposes that a conductive polymer formed into a composite with an ionic polymer is used for a solid electrolytic capacitor.

SUMMARY

An electrolytic capacitor according to one aspect of the present disclosure includes a capacitor element. The capacitor element includes an anode body, a dielectric layer disposed on a surface of the anode body, a solid electrolyte layer covering at least a part of the dielectric layer, and a first layer covering at least a part of the solid electrolyte layer. The first layer is in contact with the solid electrolyte layer. The first layer constitutes at least a part of a cathode lead-out layer. An electrode potential $P_s$ of the solid electrolyte layer is higher than an electrode potential $P_1$ of the first layer.

A capacitor element according to another aspect of the present disclosure, includes an anode body, a dielectric layer disposed on a surface of the anode body, a solid electrolyte layer covering at least a part of the dielectric layer, and a first layer covering at least a part of the solid electrolyte layer. The first layer is in contact with the solid electrolyte layer. The first layer constitutes at least a part of a cathode lead-out layer. An electrode potential $P_s$ of the solid electrolyte layer is higher than an electrode potential $P_1$ of the first layer.

An electrolytic capacitor in which an increase in ESR is suppressed can be provided.

BRIEF DESCRIPTION OF THE DRAWINGS

FIG. 1 is a schematic cross-sectional view illustrating an electrolytic capacitor according to an exemplary embodiment of the present disclosure.

DESCRIPTION OF EMBODIMENT

Prior to the description of an exemplary embodiment, problems in the conventional technology will be briefly described below.

In an electrolytic capacitor including a solid electrolyte layer, a conductive polymer included in the solid electrolyte layer is gradually oxidized and deteriorated, and thus ESR increases. When the conductive polymer is oxidized and deteriorated, a resistance of the solid electrolyte layer increases, and an electrostatic capacity decreases. Such an increase in ESR or a decrease in electrostatic capacity causes the reliability of the electrolytic capacitor to decrease. In particular, when the electrolytic capacitor is exposed to a high-temperature environment for a long period of time, oxidative degradation of the conductive polymer becomes remarkable, and an increase in ESR or a decrease in electrostatic capacity is likely to occur.

In general, when an electrode potential of a metal is high, oxidation is less likely to occur compared with a metal having low electrode potential. When a component having a function of electron transfer such as water molecules is interposed between a member containing a first metal and a member containing a second metal having an electrode potential lower than that of the first metal in a state where these members are in contact with each other, only the second metal is oxidized to form a local battery.

In the case of an electrolytic capacitor, infiltration of moisture into the electrolytic capacitor may cause oxidative degradation of the conductive polymer to proceed. It has been found that one of the factors of the oxidative degradation is that an electrode potential of the solid electrolyte layer is lower than an electrode potential of a layer of a cathode lead-out layer which is in contact with the solid electrolyte layer, so that the oxidation of the conductive polymer preferentially proceeds. Oxidative degradation of the conductive polymer is remarkable particularly in a high-temperature environment.

In view of such a new finding, in the electrolytic capacitor or the capacitor element of the present disclosure, the electrode potential $P_s$ of the solid electrolyte layer is made higher than the electrode potential $P_1$ of the first layer that covers at least a part of the solid electrolyte layer and constitutes at least a part of the cathode lead-out layer. The first layer is in contact with the solid electrolyte layer.

By setting the electrode potential $P_s$ of the solid electrolyte layer higher than the electrode potential $P_1$ of the first layer, oxidation of the conductive polymer contained in the solid electrolyte layer is suppressed, and deterioration of the solid electrolyte layer is suppressed. Accordingly, an increase in ESR is suppressed. Further, since an increase in resistance associated with deterioration of the solid electrolyte layer is suppressed, a decrease in electrostatic capacity is also suppressed. Thus, the reliability of the electrolytic capacitor can be enhanced.

The electrode potential $P_s$ of the solid electrolyte layer can be adjusted, for example, by selecting or adjusting a type of the conductive polymer, a type of the dopant, a ratio of the dopant, and a potential (hereinafter, referred to as a polymerization potential) and a current applied when the conductive polymer is formed by polymerization. When the conductive polymer is generated on a flat surface to form the solid electrolyte layer, there is a certain correlation between the electrode potential $P_s$ of the solid electrolyte layer and the polymerization potential. However, actually, in the electrolytic capacitor, the dielectric layer is formed along an inner wall surface of a hole or a dent (pit) on a surface of the anode body in which at least a surface layer is porous, and the solid electrolyte layer is also formed along the inner wall surface of the hole or the pit so as to cover the dielectric layer. Hence, the electrode potential $P_s$ of the solid electrolyte layer in the electrolytic capacitor is not generally correlated with the polymerization potential.

Note that the electrode potentials $P_s$ and $P_1$ are values measured using a silver/silver chloride electrode (Ag/Ag$^+$) as a reference electrode.

Hereinafter, the electrolytic capacitor of the present disclosure and a method of manufacturing the electrolytic capacitor will be described more specifically with reference to the drawings as necessary.

[Electrolytic Capacitor]

An electrolytic capacitor includes one or more capacitor elements. In at least one of the capacitor elements included in the electrolytic capacitor, $P_s > P_1$ may be satisfied. When the electrolytic capacitor includes two or more capacitor elements, preferably, $P_s > P_1$ is satisfied in 50% or more of the capacitor elements, more preferably, $P_s > P_1$ is satisfied in 75% or more of the capacitor elements, and further preferably, $P_s > P_1$ is satisfied in all of the capacitor elements.

(Capacitor Element)
(Anode Body)

The anode body may include a valve metal, an alloy containing a valve metal, a compound containing a valve metal, or the like. These materials can be used singly or in combination of two or more kinds thereof. As the valve metal, for example, aluminum, tantalum, niobium, and titanium are preferably used. The anode body having a porous surface is obtained by, for example, roughening a surface of a base material (such as a foil-like or plate-like base material) containing a valve metal. The roughening can be performed by, for example, an etching treatment or the like. Further, the anode body may be a molded body of particles that include a valve metal or a sintered body of the molded body. Note that the sintered body has a porous structure.

(Dielectric Layer)

The dielectric layer is an insulating layer that functions as a dielectric material formed so as to cover a surface of at least a part of the anode body. The dielectric layer is formed by anodizing the valve metal of the surface of the anode body by an anodizing treatment or the like. It is sufficient that the dielectric layer is formed so as to cover at least a part of the anode body. Usually, the dielectric layer is formed on the surface of the anode body. Since the dielectric layer is formed on the porous surface of the anode body, the dielectric layer is formed along an inner wall surface of a hole or a pit on the surface of the anode body.

The dielectric layer contains an oxide of the valve metal. For example, when tantalum is used as the valve metal, the dielectric layer contains $Ta_2O_5$, and when aluminum is used as the valve metal, the dielectric layer contains $Al_2O_3$. Note that the dielectric layer is not limited thereto, and any dielectric layer may be used as long as the dielectric layer functions as a dielectric material.

(Solid Electrolyte Layer)

The solid electrolyte layer is formed on the surface of the anode body so as to cover the dielectric layer with the dielectric layer interposed therebetween. The solid electrolyte layer does not necessarily cover the entire dielectric layer (the entire surface of the dielectric layer), and it is sufficient that the solid electrolyte layer may be formed so as to cover at least a part of the dielectric layer. The solid electrolyte layer constitutes at least a part of the cathode body in the electrolytic capacitor. The cathode body usually includes a solid electrolyte layer and a cathode lead-out layer.

In the electrolytic capacitor or the capacitor element of the present disclosure, the electrode potential $P_s$ of the solid electrolyte layer is set higher than the electrode potential $P_1$ of the first layer included in the cathode lead-out layer. A difference between $P_s$ and $P_1$ is, for example, 0.02 V or more, preferably 0.05 V or more, and more preferably 0.1 V or more. When the difference between $P_s$ and $P_1$ is in such a range, oxidative degradation of the solid electrolyte layer can be further suppressed.

The electrode potential $P_s$ of the solid electrolyte layer may be, for example, higher than 0.2 V, 0.22 V or higher, or 0.25 V or higher. Depending on the electrode potential $P_1$ of the first layer, the oxidative degradation of the solid electrolyte layer can be more easily suppressed by setting $P_s$ in such a range. An upper limit of $P_s$ is not particularly limited, but may be, for example, 0.5 V or less.

The electrode potential $P_s$ of the solid electrolyte layer can be measured using silver ($Ag/Ag^+$) as a reference electrode in a state in which a sample in a state where the solid electrolyte layer is exposed is immersed in a 1.5 wt % p-toluenesulfonic acid aqueous solution. The sample can be produced by cutting the capacitor element with a microtome or the like until the solid electrolyte layer is exposed. The electrode potential $P_1$ of the first layer can also be measured using a sample in a state where the first layer is exposed, in accordance with the case of the electrode potential $P_s$ of the solid electrolyte layer. The sample can be produced by cutting the capacitor element with a microtome or the like as necessary until the first layer is exposed.

The solid electrolyte layer contains a conductive polymer. The solid electrolyte layer may further contain at least one of a dopant and an additive agent as necessary.

As the conductive polymer, there can be used, for example, a known polymer used for an electrolytic capacitor, such as a π-conjugated conductive polymer. Examples of the conductive polymer include polymers having polypyrrole, polythiophene, polyaniline, polyfuran, polyacetylene, polyphenylene, polyphenylene vinylene, polyacene, and polythiophene vinylene as a basic skeleton. Among these polymers, for example, it is preferable to use polymer that adopts polypyrrole, polythiophene or polyaniline as a basic skeleton. The above-mentioned polymer also includes a homopolymer, a copolymer of two or more kinds of monomers, and derivatives of these polymers (a substitute having a substituent group). For example, polythiophene includes poly (3,4-ethylenedioxythiophene) and the like.

As the conductive polymer, one kind may be used alone, or two or more kinds may be used in combination.

A weight-average molecular weight (Mw) of the conductive polymer is not particularly limited, and is, for example, in a range from 1,000 to 1,000,000, inclusive.

Note that, in the present specification, the weight-average molecular weight (Mw) is a value in terms of polystyrene measured by gel permeation chromatography (GPC). Note that usually, GPC is measured using a polystyrene gel column and water/methanol (volume ratio: 8/2 ) that form a mobile phase.

The solid electrolyte layer can further contain a dopant. As the dopant, for example, at least one selected from the group consisting of an anion and a polyanion is used.

As the anion, for example, a sulfate ion, a nitrate ion, a phosphate ion, a borate ion, an organic sulfonate ion, a carboxylic acid ion and the like can be named. However, the anion is not particularly limited. Examples of the dopant that generates sulfonate ions include p-toluenesulfonic acid and naphthalenesulfonic acid.

As polyanion, for example, a polymer-type polysulfonic acid, and a polymer-type polycarboxylic acid and the like can be named. As the polymer-type polysulfonic acid, a polyvinylsulfonic acid, a polystyrenesulfonic acid, a polyallylsulfonic acid, a polyacrylsulfonic acid, a polymethacrylsulfonic acid and the like can be named. As the polymer-type polycarboxylic acid, a polyacrylic acid and a polymethacrylic acid can be named. The polyanion also includes a polyester sulfonic acid, a phenolsulfonic acid novolak resin and the like. However, the polyanion is not limited to such a kind.

Each of the anion and the polyanion may be contained in the solid electrolyte layer in the form of a salt. In the solid electrolyte layer, each of the anion and the polyanion may form a conductive polymer composite together with the conductive polymer.

A content ratio of the dopant contained in the solid electrolyte layer is, for example, in a range from 10 parts by mass to 1000 parts by mass, inclusive, and may be in a range from 20 parts by mass to 500 parts by mass, inclusive, or in a range from 50 parts by mass to 200 parts by mass, inclusive, with respect to 100 parts by mass of the conductive polymer.

The solid electrolyte layer may be a single layer or may be formed of a plurality of layers. When the solid electrolyte layer is formed of the plurality of layers, the conductive polymers contained in the layers may be the same or different. Further, the dopants included in the layers may be the same or different.

The solid electrolyte layer may further contain a known additive agent and a known conductive material other than the conductive polymer as necessary. Examples of such a conductive material include at least one selected from the group consisting of conductive inorganic materials such as manganese dioxide and TCNQ complex salts.

Note that a layer for improving adhesiveness may be interposed between the dielectric layer and the solid electrolyte layer.

The solid electrolyte layer is formed, for example, by polymerizing a precursor on the dielectric layer using a treatment liquid containing the precursor of the conductive polymer. The polymerization can be performed by at least one of chemical polymerization and electrolytic polymerization. Examples of the precursor of the conductive polymer include monomers, oligomers, prepolymers or the like. The solid electrolyte layer may be formed by attaching a treatment liquid (for example, a dispersion or solution) containing a conductive polymer to the dielectric layer, and then drying the treatment liquid. Examples of the dispersion medium (or solvent) include water, an organic solvent, and a mixture thereof. The treatment liquid may further contain another component such as a dopant.

When a treatment liquid containing a precursor of a conductive polymer is used, an oxidizing agent is used to polymerize the precursor. The oxidizing agent may be contained in the treatment liquid as an additive agent. Further, the oxidizing agent may be applied to the anode body before or after the treatment liquid is brought into contact with the anode body on which the dielectric layer is formed. As such an oxidizing agent, a sulfate, a sulfonic acid, and a salt of the sulfonic acid can be named. One kind of oxidizing agent can be used singly, or two or more kinds of oxidizing agents can be used in combination. As the sulfate, for example, a salt of a sulfuric acid such as ferric sulfate or sodium persulfate or a sulfuric acid group such as persulfuric acid and metal can be named. Examples of the metal constituting the salt include alkali metals (sodium, potassium, etc.), iron, copper, chromium, and zinc. The sulfonic acid or the salt of the sulfonic acid has a function as a dopant in addition to a function as an oxidizing agent. As the sulfonic acid or the salt of the sulfonic acid, a low molecular sulfonic acid or a salt of the low molecular sulfonic acid exemplified as the dopant can be used.

A step of forming the solid electrolyte layer by immersion in the treatment liquid and polymerization (or drying) may be performed once, or may be repeated a plurality of times. In each time, conditions such as the composition and viscosity of the treatment liquid may be the same, or at least one condition may be changed.

When the solid electrolyte layer is formed using chemical polymerization or a treatment liquid containing a conductive polymer, the electrode potential $P_s$ of the solid electrolyte layer can be adjusted by selecting the type of the conductive polymer and the type of the dopant, or adjusting an amount or concentration of the dopant. When the solid electrolyte layer is formed by electrolytic polymerization, the electrode potential $P_s$ can be adjusted by selecting the type of the conductive polymer and the type of the dopant, adjusting the amount or concentration of the dopant, or adjusting the polymerization potential.

(Cathode Lead-Out Layer)

The cathode lead-out layer only needs to include at least a first layer that is in contact with the solid electrolyte layer and covers at least a part of the solid electrolyte layer, and may include a first layer and a second layer covering the first layer. Examples of the first layer include a layer containing conductive particles and a metal foil. Examples of the conductive particles include at least one selected from conductive carbon and metal powder. For example, the cathode lead-out layer may include a layer containing conductive carbon as the first layer, and a layer containing metal powder or a metal foil as the second layer. When a metal foil is used as the first layer, this metal foil may constitute the cathode lead-out layer.

The first layer containing conductive carbon can be formed by, for example, immersing an anode body having a dielectric layer on which a solid electrolyte layer is formed in a dispersion liquid containing conductive carbon, or applying a paste containing conductive carbon to a surface of the solid electrolyte layer. As the conductive carbon, for example, graphites such as artificial graphite and natural graphite, and carbon black are used. As the dispersion liquid and the paste, for example, one obtained by dispersing conductive carbon in an aqueous liquid medium is used.

The layer containing metal powder as the second layer can be formed, for example, by laminating a composition containing metal powder on a surface of the first layer. As such a second layer, for example, a metal paste layer formed using a composition containing metal powder such as silver particles and a resin (binder resin) can be used. As the resin, although a thermoplastic resin can be used, a thermosetting resin such as an imide resin or an epoxy resin is preferably used.

When a metal foil is used as the first layer, the type of metal is not particularly limited, but it is preferable to use a valve metal such as aluminum, tantalum, or niobium, or an alloy containing the valve metal. If necessary, a surface of the metal foil may be roughened by etching treatment or the like. On the surface of the metal foil may be provided an anodization film, a film of a metal different from the metal that constitutes the metal foil (different type of metal), or a nonmetal film. Examples of the different type of metal and nonmetal include metals such as titanium and nonmetals such as carbon (conductive carbon and the like).

A coating film of the different type of metal or nonmetal (for example, conductive carbon) may be used as the first layer, and the metal foil may be used as the second layer.

The electrode potential $P_1$ of the first layer can be adjusted by selecting the material and form of the first layer.

A thickness of the first layer is, for example, in a range from 0.1 μm to 100 μm inclusive, may be in a range from 0.5 μm to 50 μm inclusive, or may be in a range from 1 μm to 20 μm inclusive.

A thickness of the second layer is, for example, in a range from 0.1 μm to 100 μm inclusive, may be in a range from 0.5 μm to 50 μm inclusive, or may be in a range from 1 μm to 20 μm inclusive.

(Separator)

When the metal foil is used for the cathode lead-out layer, a separator may be disposed between the metal foil and the anode body. The separator is not particularly limited. For example, it is possible to use an unwoven fabric including fibers of cellulose, polyethylene terephthalate, vinylon, or polyamide (for example, aliphatic polyamide or aromatic polyamide such as aramid).

(Others)

The electrolytic capacitor may be a wound type, or may be either a chip type or a stacked type. For example, the electrolytic capacitor may include a stack body of two or more capacitor elements. A configuration of the capacitor element may be selected in accordance with the type of the electrolytic capacitor.

In the capacitor element, one end part of the cathode terminal is electrically connected to the cathode lead-out layer. For example, a conductive adhesive is applied to the cathode body, and the cathode terminal is bonded to the cathode body via the conductive adhesive. One end part of the anode terminal is electrically connected to the anode body. The other end part of the anode terminal and the other end part of the cathode terminal are drawn out from a resin exterior body. Each of the other end part of the anode terminal and the other end part of the cathode terminal which are exposed from the resin exterior body is used for, for example, solder connection to a substrate (not illustrated) on which the electrolytic capacitor is to be mounted.

The capacitor element is sealed by using the resin exterior body or a case. For example, a material resin (for example, uncured thermosetting resins and fillers) of the capacitor element and the exterior body may be housed in a mold, and the capacitor element may be sealed with the resin exterior body by a transfer molding method, a compression molding method, or the like. At this time, a part of the other end part of each of the anode terminal and the cathode terminal that is drawn out from the capacitor element is exposed from the mold. The anode terminal is connected to the anode lead. Alternatively, the electrolytic capacitor may be formed by housing the capacitor element in a bottomed case such that the part of the other end part of each of the anode terminal and the cathode terminal is positioned at a side close to an opening of the bottomed case, and then sealing the opening of the bottomed case with a sealing body.

FIG. 1 is a cross-sectional view schematically illustrating a structure of an electrolytic capacitor according to one exemplary embodiment of the present invention. As illustrated in FIG. 1, electrolytic capacitor 1 includes capacitor element 2, resin exterior body 3 that seals capacitor element 2, and anode terminal 4 and cathode terminal 5 that are each at least partially exposed to an outside of resin exterior body 3. Anode terminal 4 and cathode terminal 5 can be made of metal such as copper or a copper alloy. Resin exterior body 3 has a substantially rectangular parallelepiped outer shape, and electrolytic capacitor 1 also has a substantially rectangular parallelepiped outer shape.

Capacitor element 2 includes anode body 6, dielectric layer 7 covering anode body 6, and cathode body 8 covering dielectric layer 7. Cathode body 8 includes solid electrolyte layer 9 covering dielectric layer 7, and cathode lead-out layer 10 covering solid electrolyte layer 9. In the illustrated example, cathode lead-out layer 10 includes carbon layer 11 as a first layer, and metal paste layer 12 as a second layer. Electrode potential $P_s$ of solid electrolyte layer 9 is higher than electrode potential $P_1$ of carbon layer 11 in contact with solid electrolyte layer 9. As a result, oxidative degradation of a conductive polymer contained in solid electrolyte layer 9 is suppressed, so that an increase in ESR is suppressed. Further, a decrease in electrostatic capacity is suppressed. Thus, the reliability of the electrolytic capacitor can be enhanced.

Anode body 6 includes a region facing cathode body 8, and a region not facing cathode body 8. In a region of anode body 6 that does not face cathode body 8, insulating separation layer 13 is formed in a part adjacent to cathode body 8 so as to cover a surface of anode body 6 in a band shape, and to restrict contact between cathode body 8 and anode body 6. In the region of anode body 6 that does not face cathode body 8, another part other than the part adjacent to cathode body 8 is electrically connected to anode terminal 4 by welding. Cathode terminal 5 is electrically connected to cathode body 8 via adhesive layer 14 made of a conductive adhesive.

EXAMPLES

Hereinafter, the present invention will be specifically described based on examples and comparative examples. However, the present invention is not limited to the following examples.

Example 1

Electrolytic capacitor 1 (electrolytic capacitor A1) illustrated in FIG. 1 was produced in the following manner, and its characteristics were evaluated.

(1) Preparation of Anode Body 6

Both surfaces of an aluminum foil (thickness: 100 μm), which is a base material, were roughened by etching to prepare anode body 6.

(2) Formation of Dielectric Layer 7

A part of the other end part of anode body 6 was immersed in an anodizing solution, and a DC voltage of 70 V was applied for 20 minutes to form dielectric layer 7 containing aluminum oxide.

(3) Formation of Solid Electrolyte Layer 9

An aqueous solution containing a pyrrole monomer and p-toluenesulfonic acid was prepared. A monomer concentration in this aqueous solution was 0.5 mol/L, and a concentration of p-toluenesulfonic acid was 0.3 mol/L.

Anode body 6 on which dielectric layer 7 was formed in the above step (2) and a counter electrode were immersed in the obtained aqueous solution, and electrolytic polymerization was performed at a polymerization voltage of 3 V (polymerization potential with respect to a silver reference electrode) at 25° C. to form solid electrolyte layer 9.

(4) Formation of Cathode Body 8

Anode body 6 on which solid electrolyte layer 9 obtained in the above step (3) was formed was immersed in a dispersion liquid in which graphite particles were dispersed in water, taken out from the dispersion liquid, and then dried to form carbon layer 11 at least on the surface of solid electrolyte layer 9. Drying was carried out at a temperature ranging from 130° C. to 180° C. for 10 minutes to 30 minutes.

Next, a silver paste that contains silver particles and a binder resin (epoxy resin) was applied onto the surface of carbon layer 11, and heated at 150° C. to 200° C. for 10 minutes to 60 minutes to cure the binder resin, thereby forming metal paste layer 12. Cathode body 8 composed of carbon layer 11 and metal paste layer 12 was thus formed.

Capacitor element 2 was produced as described above.

(5) Assembly of Electrolytic Capacitor 1

Cathode body 8 of capacitor element 2 obtained in the above step (4) was bonded to one end part of cathode terminal 5 with adhesive layer 14 of a conductive adhesive. One end part of anode body 6 protruding from capacitor element 2 and one end part of anode terminal 4 were joined by laser welding.

Subsequently, resin exterior body 3 made of an insulating resin was formed around capacitor element 2 by molding. At this time, the other end part of anode terminal 4 and the other end part of cathode terminal 5 were drawn out from resin exterior body 3.

In this way, electrolytic capacitor A1 was completed. A total of 20 electrolytic capacitors A1 were produced in the same manner as described above.

(6) Evaluation

The following evaluations were performed using the electrolytic capacitors or the capacitor elements.

(a) Electrode Potentials $P_s$ and $P_1$

Electrode potential $P_s$ of solid electrolyte layer 9 and electrode potential $P_1$ of carbon layer 11 as the first layer were measured by using capacitor element 2 according to the procedure described above.

(b) Change Ratio in ESR and Change Ratio in Electrostatic Capacity

Under an environment of 20° C., initial electrostatic capacity (g) of each electrolytic capacitor at a frequency of 120 kHz was measured, and initial ESR (mΩ) at a frequency of 100 kHz was measured using an LCR meter for 4-terminal measurement. Then, an average value of the 20 pieces of electrolytic capacitors was obtained.

Next, an acceleration test was performed by applying a rated voltage to the electrolytic capacitor for 500 hours under an environment of 145° C. and 0.4% RH. Thereafter, electrostatic capacity and ESR were measured in an environment at 20° C. in the same procedure as in the initial electrostatic capacity and ESR, and an average value of the 20 pieces of electrolytic capacitors was obtained. A ratio (%) of the average value of the electrostatic capacity after the acceleration test with respect to the average value of the initial electrostatic capacity was calculated as a change ratio (ΔCap) in electrostatic capacity. A ratio (%) of the average value of the ESR after the acceleration test with respect to the average value of the initial ESR was calculated as a change ratio (ΔESR) in ESR.

Examples 2 to 3 and Comparative Examples 1 to 3

Electrolytic polymerization was performed by changing the concentration of p-toluenesulfonic acid in the aqueous solution and changing the polymerization voltage in step (3) of Example 1. Capacitor elements and electrolytic capacitors were produced and evaluated in the same manner as in Example 1 except for these.

Evaluation results are shown in Table 1. In Table 1, electrolytic capacitors A1 to A3 are examples 1-3, respectively, and electrolytic capacitors B1 to B3 are comparative examples 1-3, respectively.

TABLE 1

| Capacitor No. | Ps (V) | $P_1$ (V) | $P_S - P_1$ (V) | ΔESR (%) | ΔCap (%) |
|---|---|---|---|---|---|
| A1 | 0.2314 | 0.2 | 0.0314 | −4.9 | −4.6 |
| A2 | 0.2512 | 0.2 | 0.0512 | −16.6 | −4.03 |
| A3 | 0.2944 | 0.2 | 0.0944 | −18.6 | −3.78 |
| B1 | 0.1098 | 0.2 | −0.0902 | 291.1 | −73.7 |
| B2 | 0.1250 | 0.2 | −0.0750 | 230.8 | −57.3 |
| B3 | 0.1845 | 0.2 | −0.0155 | 89.0 | −42.6 |

According to the present disclosure, there is provided an electrolytic capacitor with excellent reliability in which an increase in ESR or a decrease in electrostatic capacity is suppressed. Such an electrolytic capacitor can be used for various applications in which high reliability is required.

The invention claimed is:

1. An electrolytic capacitor comprising a capacitor element, wherein:
   the capacitor element includes:
      an anode body;
      a dielectric layer disposed on a surface of the anode body;
      a solid electrolyte layer covering at least a part of the dielectric layer, the solid electrolyte layer including polypyrrole and p-toluenesulfonic acid and being formed by an electrolytic polymerization; and
      a first layer covering at least a part of the solid electrolyte layer, the first layer being in contact with the solid electrolyte layer,
   the first layer constitutes at least a part of a cathode lead-out layer, and
   an electrode potential $P_s$ of the solid electrolyte layer is higher than an electrode potential $P_1$ of the first layer.

2. The electrolytic capacitor according to claim 1, wherein a difference between $P_s$ and $P_1$ is 0.02 V or more.

3. The electrolytic capacitor according to claim 1, wherein $P_s$ is more than 0.2 V.

4. The electrolytic capacitor according to claim 1, wherein the first layer includes conductive carbon.

5. The electrolytic capacitor according to claim 1, wherein:
   the cathode lead-out layer includes the first layer and a second layer covering at least a part of the first layer, and
   the second layer contains metal powder.

6. The electrolytic capacitor according to claim 1, comprising a stack body of two or more capacitor elements, each of the two or more capacitor elements being the capacitor element.

7. A capacitor element comprising:
   an anode body;
   a dielectric layer disposed on a surface of the anode body;
   a solid electrolyte layer covering at least a part of the dielectric layer, the solid electrolyte layer including polypyrrole and p-toluenesulfonic acid and being formed by an electrolytic polymerization; and
   a first layer covering at least a part of the solid electrolyte layer, the first layer being in contact with the solid electrolyte layer, wherein:
   the first layer constitutes at least a part of a cathode lead-out layer, and
   an electrode potential $P_s$ of the solid electrolyte layer is higher than an electrode potential $P_1$ of the first layer.

* * * * *